(12) United States Patent
Umeda et al.

(10) Patent No.: US 6,181,044 B1
(45) Date of Patent: Jan. 30, 2001

(54) VEHICLE AC GENERATOR STATOR

(75) Inventors: Atsushi Umeda, Okazaki; Tsutomu Shiga, Nukata-gun; Shin Kusase, Obu, all of (JP)

(73) Assignee: Denso Corporation, Kariya (JP)

( * ) Notice: Under 35 U.S.C. 154(b), the term of this patent shall be extended for 0 days.

(21) Appl. No.: 09/440,884

(22) Filed: Nov. 16, 1999

(30) Foreign Application Priority Data

Nov. 26, 1998 (JP) .................................................. 10-335639

(51) Int. Cl.[7] .......................... H02K 15/085; H02K 3/12
(52) U.S. Cl. .......................... 310/201; 310/180; 310/184; 310/42; 29/596
(58) Field of Search ..................................... 310/254, 179, 310/180, 184, 42, 270, 201; 29/596

(56) References Cited

U.S. PATENT DOCUMENTS

| 2,407,935 | * | 9/1946 | Perfetti et al. | 310/179 |
| 4,238,702 | * | 12/1980 | Belova et al. | 310/179 |
| 4,833,356 | * | 5/1989 | Bansai et al. | 310/207 |

FOREIGN PATENT DOCUMENTS

| 59-111482 | 7/1984 | (JP) | H02K/19/22 |
| 92/06527 | 4/1992 | (WO) | H02K/3/12 |
| 98/54823 | 12/1998 | (WO) | H02K/23/00 |

* cited by examiner

Primary Examiner—Burton Mullins
(74) Attorney, Agent, or Firm—Pillsbury Madison & Sutro LLP

(57) ABSTRACT

A stator of a vehicle AC generator including a stator core having a plurality of slots and a stator winding disposed in the slot. The stator winding includes a plurality of conductor segments having an in-slot portion disposed in one of a plurality of radially aligned slot-layers of one of the slots and an inclined coil-end portion extending from the in-slot portion having a connection-end positioned in one of a plurality of circular layers corresponding to the slot layers formed at an end of the stator core. The connection-end in one of the circular layers is connected to another connection-end in adjacent one of the circular layers to form a junction radially and circumferentially spaced apart from other junctions.

13 Claims, 6 Drawing Sheets

VEHICLE AC GENERATOR STATOR

CROSS REFERENCE TO RELATED APPLICATION

The present application is based on and claims priority from Japanese Patent Application Hei 10-335639 filed on Nov. 26, 1998, the contents of which are incorporated herein by reference.

BACKGROUND OF THE INVENTION

1. Field of the Invention

The present invention relates to a vehicle AC generator stator, and particularly a stator winding arrangement.

2. Description of the Related Art

PCT application WO92/06527 discloses a stator winding arrangement, which is composed of U-shaped conductor segments welded to one another at their connection ends. The connection ends are disposed in a circular layer at one end of the stator core at equal intervals. Each U-shaped conductor segment has two in-slot portions inserted into a pair of slots, and four in-slot portions are disposed in each slot. Accordingly, four connection ends extend from each slot to be welded to form a stator winding. Because all the connection ends are aligned in the circular layer, the interval between welded junctions of the connection ends becomes so small that insulation between the junctions becomes difficult, and that cooling air can not pass therethrough very well.

SUMMARY OF THE INVENTION

A main object of the invention is to provide an improved stator having a stator winding composed of a plurality of conductor segments.

Another object of the invention is to provide an improved stator winding composed of a plurality of conductor segments welded to one another at connection ends that are sufficiently spaced apart from one another.

According to a preferred embodiment of the invention, each of a plurality of conductor segments of a stator winding includes an in-slot portion and an inclined coil-end portion having a connection-end positioned in a circular layer corresponding to a slot-layer. The connection-end in one of a plurality of circular layers is connected to another connection-end in an adjacent circular layer to form a junction radially and circumferentially spaced apart from other junctions. Each of the segments can have another connection-end positioned in a circular layer at the opposite core end corresponding to the slot layer.

More specifically, a stator winding comprises a plurality of sets of U-shaped large and small segments including a pair of in-slot portions each disposed in one of a plurality of radially aligned slot-layers and contiguous inclined coil-end portions each having a connection-end. The pair of in-slot portions of the large segment is disposed in a pair of the slots one-pole pitch spaced apart from each other so that one in-slot portion is disposed in the innermost slot-layer of one of the pair of slots and the other in-slot portion is disposed in the outermost slot-layer. One of the connection-ends of the large segment is positioned in the innermost circular layer corresponding to the innermost slot-layer formed at an end of the stator core, and the other of the connection-ends is positioned circumferentially spaced apart from the one of the connection ends in the outermost circular layer corresponding to the outermost slot-layer. The pair of in-slot portions of the small segment is disposed in the pair of the slots so that one in-slot portion is disposed in the inner middle slot-layer of one of the pair of slots and the other in-slot portion is disposed in the outer middle slot-layer. One of the connection-ends of the small segment is positioned in the inner middle circular layer corresponding to the inner middle slot-layer to be in contact with the coil-end of the large segment positioned in the innermost circular layer to form an inner junction, and the other of the connection-ends is positioned circumferentially spaced apart from the one of the connection ends in the outer middle circular layer corresponding to the outer middle slot-layer to be in contact with the coil-end of the large segment positioned in the outermost circular layer to form an outer junction.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

The invention is described with reference to the appended drawings.

Figure 1:
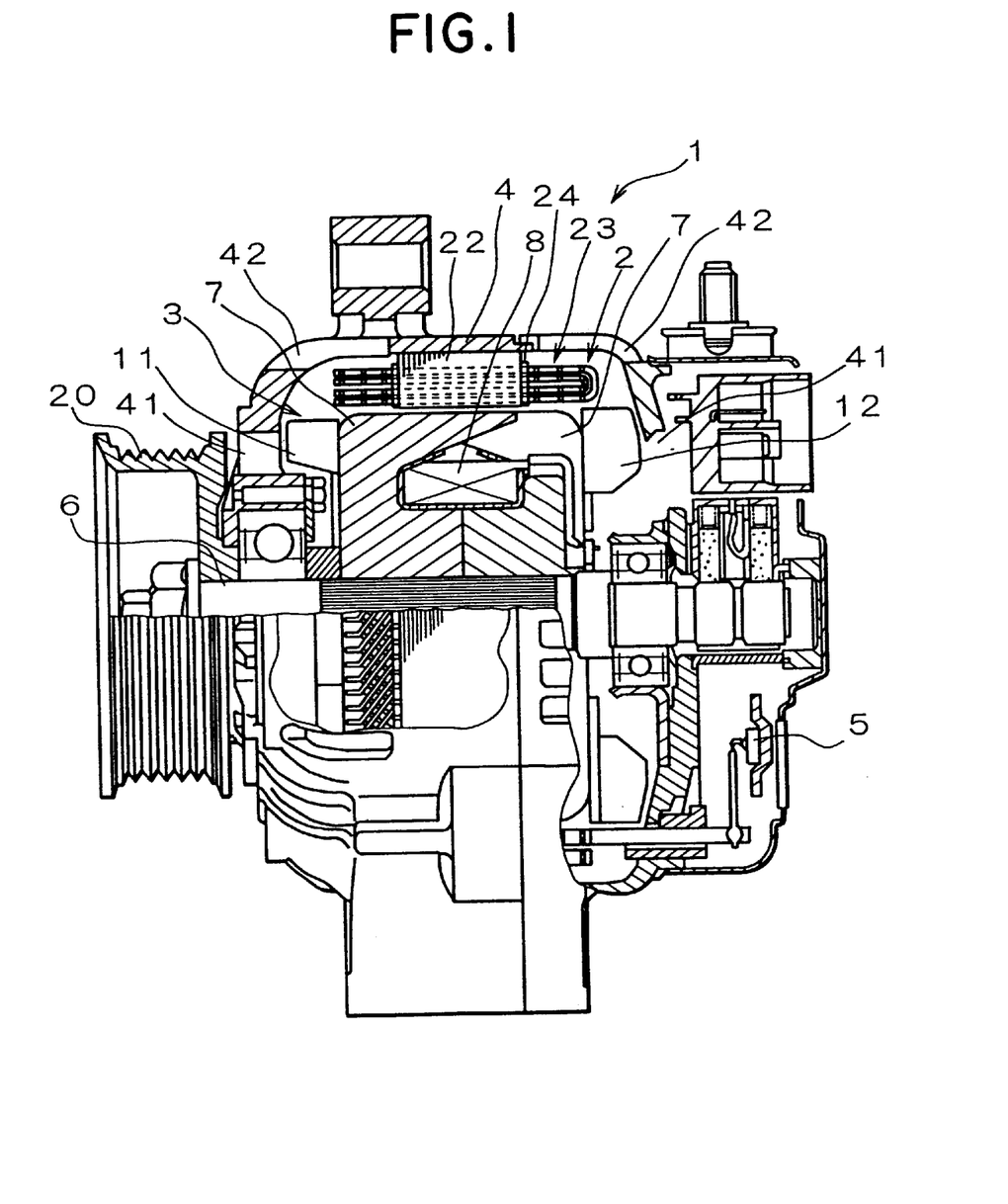
FIG. 1 is a cross-sectional view of an AC generator for a vehicle equipped with a stator according to a preferred embodiment of the invention.

As shown in FIG. 1, a vehicle AC generator 1 includes stator 2, rotor 3, frame 4 and rectifier 5.

Stator 2 includes stator core 22, a stator winding composed of a plurality of conductor segments 23, and a plurality of insulators 24 disposed between stator core and each of conductor segments 23.

Rotor 3 includes, shaft 6, a pair of front and rear pole cores 7 and a cylindrically wound field coil 8. One pole core 7 has six claw poles extending to interleave with six claw poles of the other pole core 7, thereby enclosing field coil 8. Front pole core 7 has mixed flow cooling fan 11 welded to the front surface thereof, and rear pole core 7 has centrifugal cooling fan 12 welded to the rear surface thereof.

Frame 4 accommodates stator 2 and rotor 3 so that rotor 3 can rotate with shaft 6 within the inner periphery of stator core 22. Frame 4 has a plurality of air-discharge windows 42 at portions thereof surrounding the coil-ends of the stator winding, and a plurality of air-intake windows 41 at the radially inner portions of the opposite ends thereof.

AC generator 1 is driven by an engine through a belt (not shown) and pulley 20 which is carried by the front end of shaft 6.

When field coil 8 is energized by an outside battery (not shown), the claw poles are polarized to supply magnetic flux to the stator winding, thereby generating AC output power. Rectifier 5 converts the AC output power to DC power.

Figure 2:
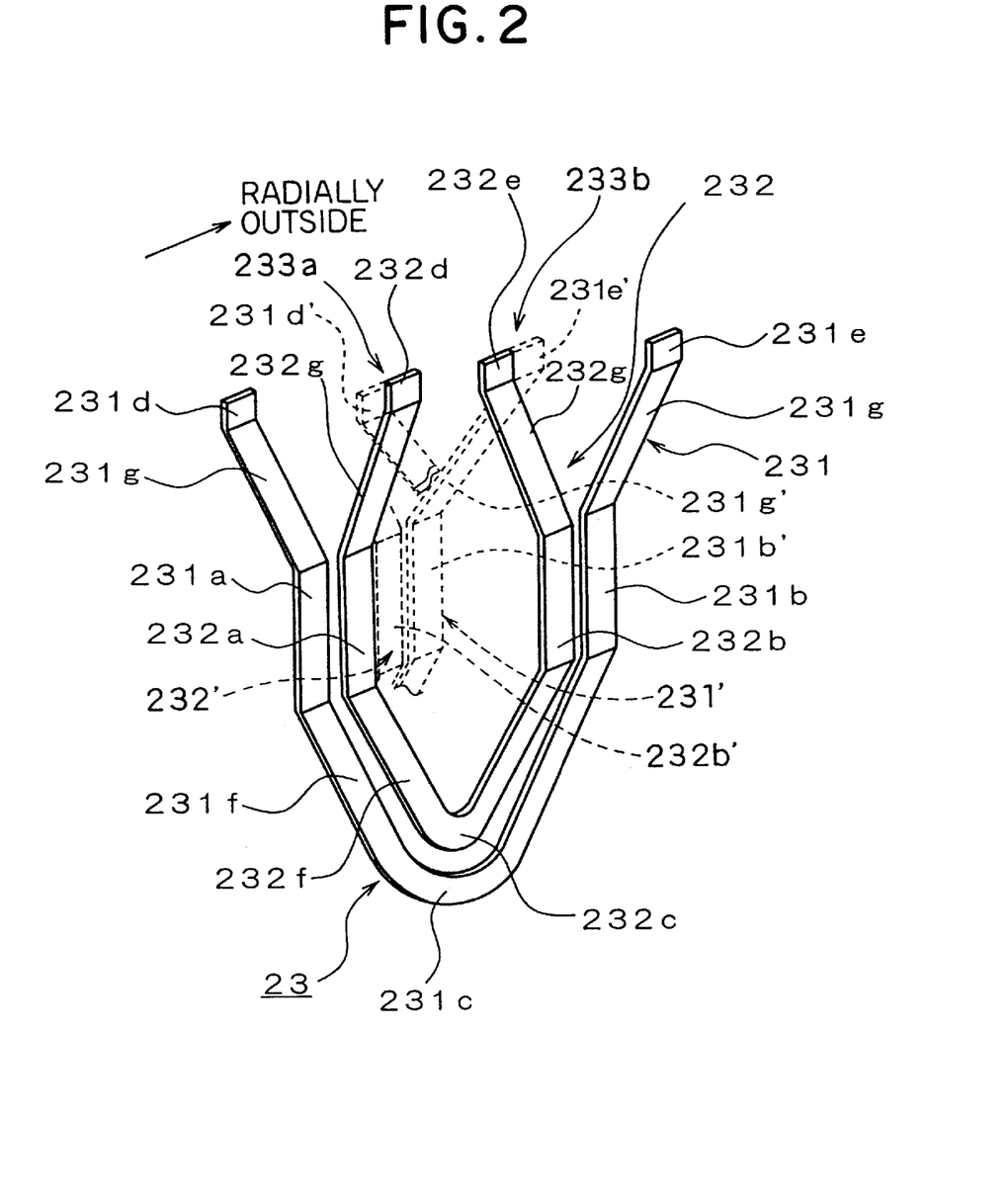
FIG. 2 is a perspective view of conductor segments of the stator according to the preferred embodiment.

As shown in FIG. 2, conductor segments 23 are formed to a plurality of sets of U-shaped large and small segments 231 and 232. Large segment 231 has a pair of in-slot portions 231a and 231b, a pair of connection-ends 231d and 231e respectively extending from the pair of in-slot portions 231a and 231b through outwardly inclined coil-end portions 231g, and turn portion 231c. Small segment 232 has a pair of in-slot portions 232a and 232b, a pair of connection-ends 232d and 232e respectively extending from the pair of in-slot portions 232a, 232b through inwardly inclined coil-end portions 232g, and turn portion 232c. Turn portion 231c of large segment 231 surrounds turn portion 232c of small segment 232 at the lower axial end of stator core 22, and coil-end portions 231g of large segment 231 are longer than coil-end portions 232g of small segments 232. It is also possible that coil-end portions 231g are made shorter than coil-end porions 232g.

One in-slot portion 231a of large segment 231 is disposed in the radially innermost layer of one slot 25, and the other in-slot portion 231b of the same segment 231 is disposed in the radially outermost layer of another slot 25 which is one pole-pitch spaced apart therefrom in the clockwise direction. One in-slot portion 232a of small segment 232 is disposed in the radially inner middle layer of the same slot as in-slot portion 231a, and the other in-slot portion 232b of the same segment 232 is disposed in the radially outer middle layer of the same slot as in-slot portion 231b.

Figure 3:
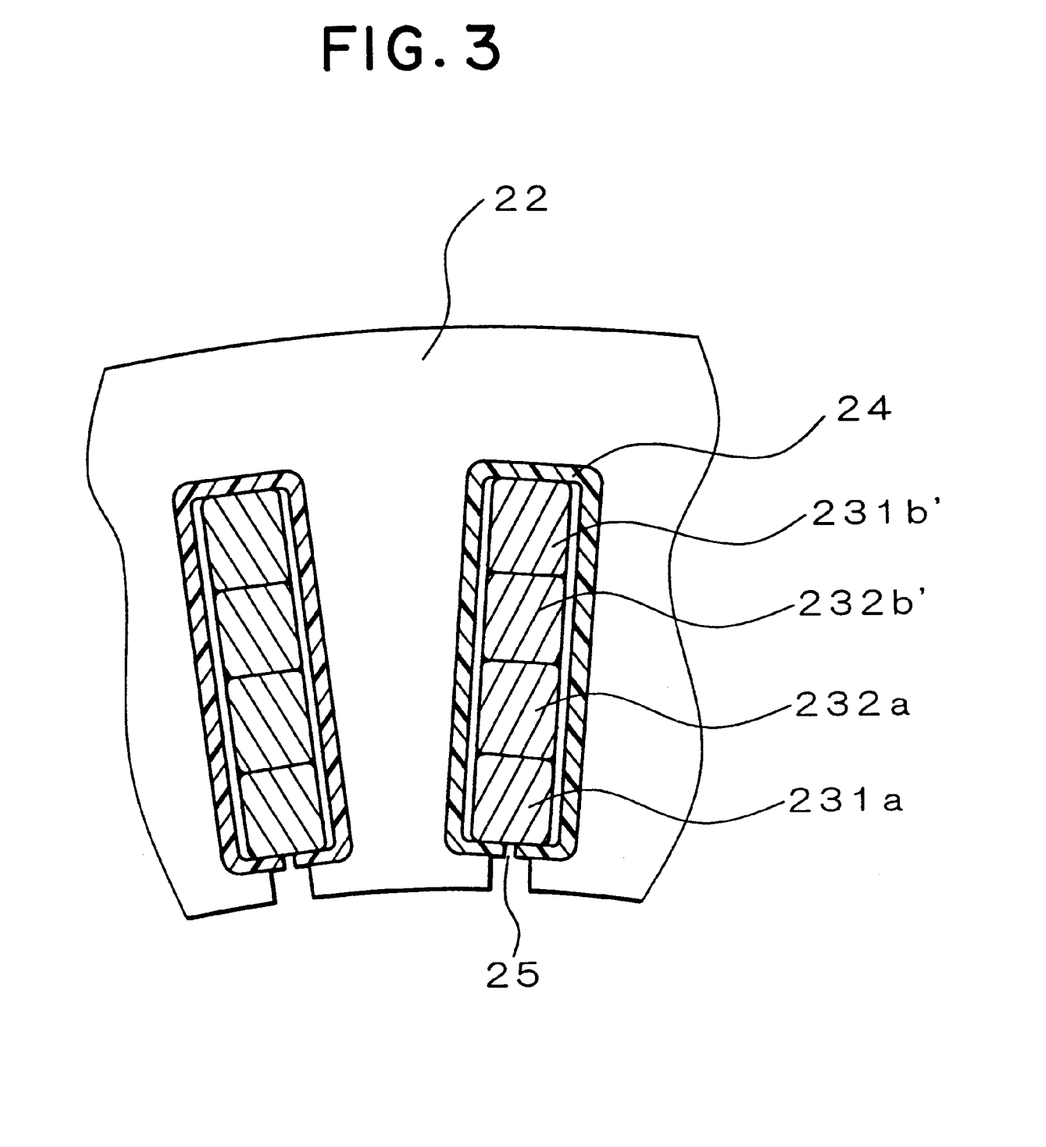
FIG. 3 is a fragmentary cross-sectional view of the stator according to the preferred embodiment.

As shown in FIG. 3, in-slot portions 231a and 231b' of two large U-shaped conductor segments 231 and 231' and in-slot portions 232a and 232b' of two small conductor segments 232 and 232' are inserted into one slot 25 in radially aligned four layers.

Figure 4:
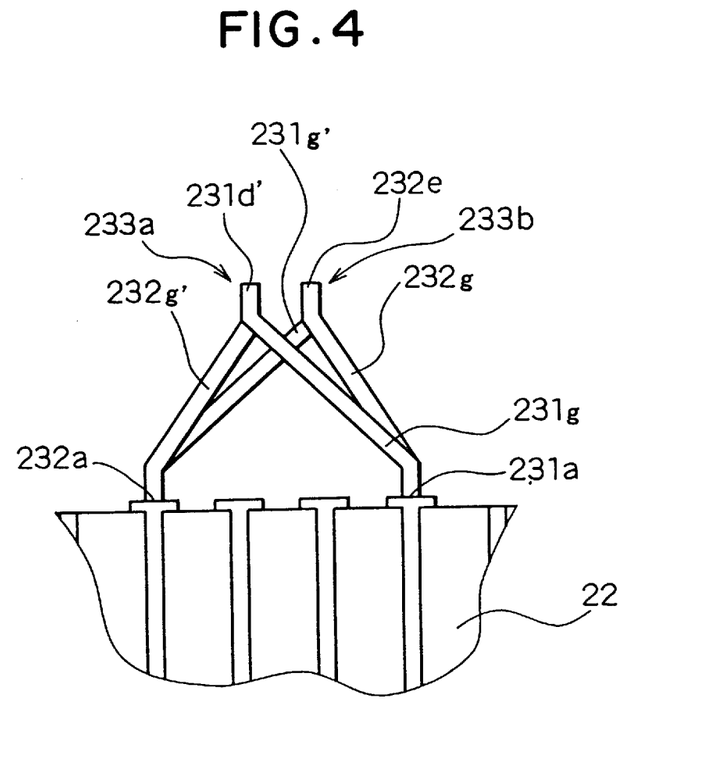
FIG. 4 is a schematic side view illustrating coil-end portions of the stator according to the preferred embodiment.
Figure 5:
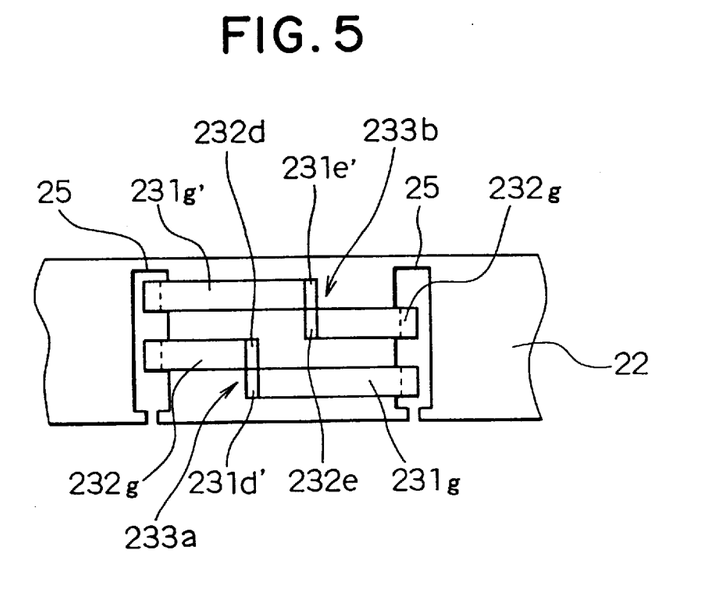
FIG. 5 is a schematic plan view illustrating the coil end portions illustrated in FIG. 4.

As shown in FIGS. 4 and 5, connection-end 231d' is positioned in the radially innermost circular layer formed at the upper axial end of stator core 22. Connection-end 231d' is also positioned at an apex of a scalene triangle formed of counterclockwise or left inclined longer coil-end portion 231g' extending from in-slot portion 231a as one side, which is inserted in the radially innermost slot-layer of one slot 25, and clockwise or right inclined shorter coil-end portion 232g extending from in-slot portion 232a as the other side, which is inserted in the inner middle slot-layer of another slot 25 that is one-pole pitch spaced apart from the one slot. Connection-end 232d is positioned in the inner middle circular layer at the same apex as connection-end 231d' to be in contact therewith to form an inner junction 233a.

Connection-end 232e is positioned in the outer middle circular layer formed at the same axial end at an apex of a scalene triangle having counterclockwise inclined shorter coil-end portion 232g extending from in-slot portion 232b inserted in the outer middle slot-layer of the one slot as one side and clockwise inclined longer coil-end portion 231g' extending from in-slot portion 231b' inserted in the outermost slot-layer of the another slot 25 as the other side. Connection-end 231e' is positioned in the outermost circular layer at the same apex as connection-end 232e to be in contact therewith to form an outer junction 233b. Thus the above two apexes are spaced apart from each other both in the radial direction and circumferential directions.

Connection-ends 231d' and 232d on the same apex are welded together to form a first junction 233a, and connection ends 232e and 231e' on the same apex are welded together to form a second junction 233b that is spaced apart from the first junction 233a, so that two large segment 231 and 231' are series connected by small segment 232.

All the sets of U-shaped large and small segments 231 and 232 are inserted, arranged and welded in the same manner as described above to form the stator winding. Thus, a plurality of junctions 233a and also a plurality of junctions 233b are respectively disposed in two concentric circular layers. The plurality of first junctions 233a and the plurality of second junctions 233b are shifted circumferentially from one another so that each of first junctions 233a can be disposed between two of second junctions 233b.

Figure 6:
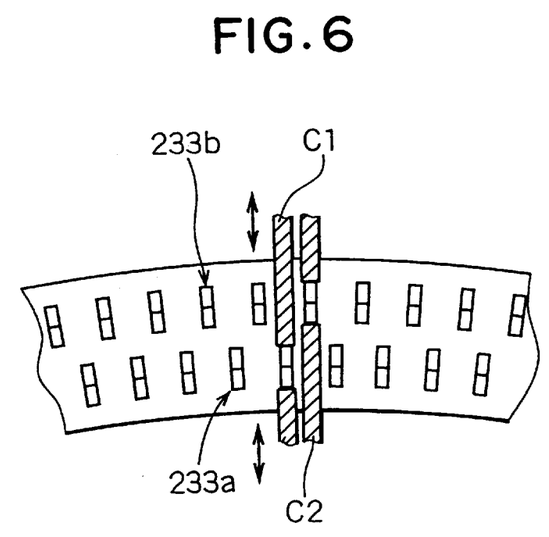
FIG. 6 is a schematic view illustrating a welding process of the stator according to the preferred embodiment.

Because all the junctions, 233a, 233b are disposed in two circular layers and circumferentially spaced apart from one another, not only cooling air can pass between the coil-end portion easily but welding process can be carried out efficiently as shown in FIG. 6, where two or more welders C1 and C2, such as tungsten inert gas welders, can be used.

Figure 7:
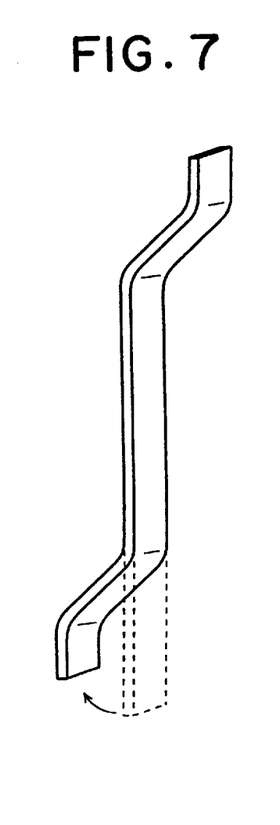
FIG. 7 is a fragmentary schematic view illustrating a variation of the stator according to the preferred embodiment.

The U-shaped segments shown in FIG. 2 can be substituted by segments having one in-slot portion and a pair of connection-ends formed at the opposite ends thereof as shown in FIG. 7. The lower connection-end can be formed after it is inserted into the slot as shown by dotted lines. The coil-end portion disposed in the outermost and the innermost circular layers are longer or shorter than the coil-end portions disposed in the outer middle and inner middle circular layers to have the circumferential spaces between the junctions of the connection portions.

Figure 8:
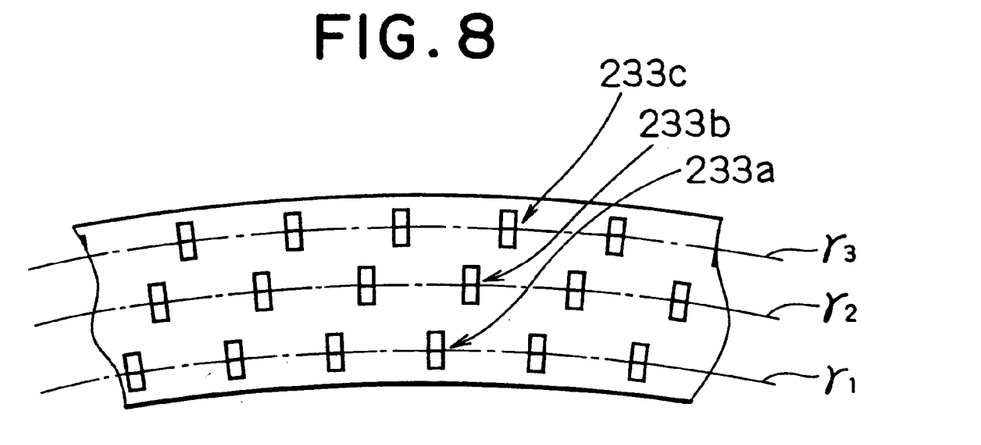
FIG. 8 is a fragmentary schematic view illustrating another variation of the stator according to the preferred embodiment.
Figure 9:
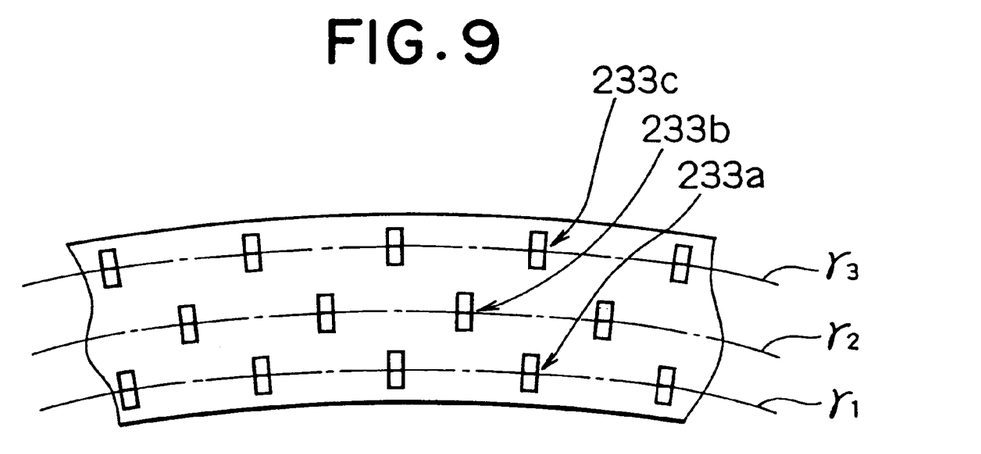
FIG. 9 is a perspective view illustrating a variation of a conductor segments of the stator according to the preferred embodiment.

Each set of conductor segments 23 can be composed of three kinds of U-shaped segments, large, medium, and small segments. The stator winding can be formed substantially in the same manner as the above. In such a case, junctions 233a, 233b, 233c are respectively distributed in three circular layers or lines r1, r2, r3 at an axial end of the stator core as shown in FIGS. 8 and 9.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A stator of a vehicle AC generator including a stator core having a plurality of slots and a stator winding disposed in said plurality of slots, said stator winding comprising:

a plurality of conductor segments having an in-slot portion disposed in one of a plurality of radially aligned slot-layers of one of said slots, an inclined coil-end portion extending from said in-slot portion having a connection-end positioned in one of a plurality of circular layers corresponding to said slot layers formed at an end of said stator core, said connection-end in one of said circular layers being weld to another connection-end in an adjacent one of said circular layers to form a junction radially and circumferentially spaced apart from other junctions.

2. The stator as claimed in claim 1, wherein each of said segments has an opposite connection-end extending from said in-slot portion to one of a plurality of circular layers corresponding to said slot layers formed at the other end of said stator core, said opposite connection-end is weld to another opposite connection-end in an adjacent one of said circular layers to form a junction spaced apart from any other junctions, thereby forming sufficient insulation spaces between all said junctions.

3. A stator of a vehicle AC generator including a stator core having a plurality of slots and a stator winding disposed in said plurality of slots, said stator winding comprising:

a plurality of sets of U-shaped large and small segments including a pair of in-slot portions each disposed in one of a plurality of radially aligned slot-layers and contiguous inclined coil-end portions each having a connection-end, said pair of in-slot portions of said large segment being disposed in a pair of said slots one-pole pitch spaced apart from each other so that one in-slot portion is disposed in the innermost slot-layer of one of said pair of slots and the other in-slot portion is disposed in the outermost slot-layer, wherein one of said connection-ends of said large segment is positioned in the innermost circular layer corresponding to said innermost slot-layer formed at an end of said stator core, and the other of said connection-ends is positioned circumferentially spaced apart from said one of said connection ends in the outermost circular layer corresponding to said outermost slot-layer, said pair of in-slot portions of said small segment is disposed in said pair of said slots so that one in-slot portion is disposed in the inner middle slot-layer of one of said pair of slots and the other in-slot portion is disposed in the outer middle slot-layer, one of said connection-ends of said small segment is positioned in the inner middle circular layer corresponding to said inner middle slot-layer to be in contact with one of said connection ends of said large segment positioned in said innermost circular layer to form an inner junction, and the other of said connection-ends is positioned circumferentially spaced apart from said one of said connection ends in the outer middle circular layer corresponding to said outer middle slot-layer to be in contact with one of said connection ends of said large segment positioned in said outermost circular layer to form an outer junction, and said pair of coil-end portions of said large segment has a different length from said pair of coil-end portions of said small segment to form a junction at an apex of a scalene triangle formed at one of the core ends.

4. A stator of a vehicle AC generator including a stator core having a plurality of slots and a stator winding disposed in said plurality of slots, said stator winding comprising:

a plurality of conductor segments having an in-slot portion disposed in one of said slots, an inclined coil-end portion extending from said in-slot portion having a connection-end positioned in one of a plurality of circular layers corresponding to said slot layers formed at an end of said stator core, said connection-end in one of said circular layers being weld to another connection-end in an adjacent one of said circular layers to form a junction radially and circumferentially spaced apart from other junctions without overlapping with other junctions in the radial direction.

5. The stator as claimed in claim 4, wherein said junction is spaced apart from others enough to allow welding work.

6. The stator as claimed in claim 4, wherein the number of said in-slot portions disposed in one of said slots is 2n, and the number of said circular layers is n, where n is a natural number.

7. The stator as claimed in claim 6, wherein said 2n in-slot portion disposed in one of said slots are radially aligned therein.

8. A method of manufacturing a vehicle AC generator stator having a plurality of slots comprising the steps of:

inserting 2n in-slot portions of conductor segments into each of said plurality of slots in radially aligned layers;

positioning a plurality of pairs of connection-ends to be weld in n circular layers so as not to overlap with each other in the circumferentially direction; and clamping said connection ends to be weld with a tool disposed in spaces formed on both circumferential sides of said connection ends.

9. A method of manufacturing a vehicle AC generator stator having a plurality of slots comprising:

inserting in-slot portions of conductor segments into each of said plurality of slots in four radially aligned slot-layers;

positioning a plurality of pairs of connection-ends of said in-slot portions disposed in the inner two slot-layers in said slots in an inner circular layers at an end of said stator and a plurality of pairs of connection-ends of said in-slot portions disposed in the outer two slot-layers in an outer circular layers so as not to overlap with those in said inner circular layer in the circumferential direction; and clamping said connection ends to be welded with a tool disposed in spaces formed on both circumferential sides of said connection ends.

10. A stator of a vehicle AC generator including a stator core having a plurality of slots and a stator winding disposed in said slots, said stator winding comprising:

a plurality of conductor segments having an in-slot portion and coil end portions, each said in-slot portion disposed in one of said slots to form a plurality of in-slot layers in said slots, said coil end portions axially extending from said slots to form coil-ends on both axial sides of said stator core; and a plurality of junctions spaced apart from each other and formed on one of said coil-ends at which said conductor segments are welded to one another, said junctions positioned in a plurality of circular layers, each of said junction layers corresponding to two adjacent ones of said in-slot layers, said junctions in each of said layers shifted circumferentially from one another.

11. A stator of vehicle AC generator claimed in claim 10, wherein two adjacent said junctions in one of said layers are spread a distance apart to permit a radially direct access to said junctions in another adjacent one of said layers.

12. A method of manufacturing a stator of a vehicle AC generator including a stator core having a plurality of conductor segments, said method comprising:

inserting in-slot portions of said conductor segments into each of said slots in a plurality of radially aligned layers;

positioning a plurality of pairs of connection-ends of said conductor segments to be welded to each other in a plurality of circular layers;

forming a plurality of junctions by connecting said pairs;

wherein said positioning includes positioning said pairs in an adjacent inner and outer layers of said circular layers so that said pairs do not overlap with each other relative to a radial direction; and wherein said forming includes clamping said pairs radially with a tool located between said pairs in another circular layer.

13. A method of mabufacturing a stator of a vehicle AC generator as claimed in claim 12, wherein said tool is operated only in a radial direction after said tool is located between said pairs.

* * * * *